United States Patent [19]

Chang et al.

[11] 4,413,086

[45] Nov. 1, 1983

[54] COATING COMPOSITIONS CONTAINING ORGANOSILANE-POLYOL

[75] Inventors: Wen-Hsuan Chang, Gibsonia, Pa.; Kyu-Wang Lee, Danville, Calif.; John B. Saunders, Jr., Allison Park, Pa.

[73] Assignee: PPG Industries, Inc., Pittsburgh, Pa.

[21] Appl. No.: 354,561

[22] Filed: Mar. 4, 1982

[51] Int. Cl.$^3$ ............................................. C08K 5/05
[52] U.S. Cl. ................................... 524/386; 524/540; 524/541; 524/506; 524/588; 525/474; 525/480; 525/509; 528/28
[58] Field of Search ............... 524/588, 540, 541, 500, 524/386, 506; 525/474, 480, 509; 528/28

[56] References Cited

U.S. PATENT DOCUMENTS

| | | | |
|---|---|---|---|
| 2,877,202 | 3/1959 | Olson | 260/45.4 |
| 2,911,386 | 11/1959 | Olson et al. | 260/46.5 |
| 2,917,467 | 12/1959 | Olson et al. | 260/2 |
| 2,925,402 | 2/1960 | Speier | 525/474 |
| 3,150,116 | 9/1964 | Masters | 260/47 |
| 3,388,101 | 6/1968 | Wismer et al. | 260/77.5 |
| 3,399,247 | 8/1968 | Windemuth et al. | 525/474 |
| 3,429,851 | 2/1969 | Coates et al. | 260/46.5 |
| 3,449,289 | 6/1969 | Schank et al. | 525/474 |
| 3,668,272 | 6/1972 | Sekniakas | 525/474 |
| 3,868,343 | 2/1975 | Stengle et al. | 525/474 |
| 4,013,698 | 3/1977 | Lohse et al. | 260/448.8 R |
| 4,069,178 | 1/1978 | Mikami et al. | 260/22 S |
| 4,093,673 | 6/1978 | Chang et al. | 260/824 EP |
| 4,113,665 | 9/1978 | Law et al. | 260/37 SB |

OTHER PUBLICATIONS

Hackh's Chemical Dictionary, pp. 131 and 535.

*Primary Examiner*—Joseph L. Schofer
*Assistant Examiner*—N. Sarofim
*Attorney, Agent, or Firm*—Thomas M. Breininger

[57] ABSTRACT

Described are water reducible coating compositions comprising (A) an organosilane-polyol which is the reaction product of a hydrophilic polycarbinol and an organosilicon material selected from the group consisting of an organosilane, a hydrolyzed and condensed organosilane and mixture, thereof; and (B) a curing agent for the coating compositions.

15 Claims, No Drawings

COATING COMPOSITIONS CONTAINING ORGANOSILANE-POLYOL

A persistent problem in the manufacture of decorative paper overlaid wood or hardboard panels has been in providing a protective coating over the paper that exhibits adequate tape release properties against, for example, the pressure sensitive adhesives on various tapes.

The present invention is directed to coating compositions containing the reaction products of polyols and specified organosilicon materials in addition to other components, which compositions, when applied to a substrate and cured, exhibit excellent short term and long term tape release properties when used, for example, over paper as found in plywood, hardboard or particleboard panels containing a paper overlay.

SUMMARY OF THE INVENTION

The coating compositions of the present invention comprise (A) an organosilane-polyol, (B) a curing agent for the coating composition, preferably an aminoplast, (C) optionally an organic solvent (D) optionally an additional, essentially unreacted polyol, (E) optionally an additional, essentially unreacted hydrolyzed and condensed organosilane, (F) optionally water, and (G) optionally a pigment. The coating compositions of the invention are water reducible. Also, the coating compositions wherein components (D) and (E) above are present are also preferred.

DETAILED DESCRIPTION OF THE INVENTION

The coating compositions of the present invention comprise:

A. an organosilane-polyol having a hydroxyl number equal to or greater than 70 which is a reaction product of
   (1) a hydrophilic organic polycarbinol having a hydroxyl number equal to or greater than 300; and
   (2) an organosilicon material selected from the group consisting of an organosilane, a hydrolyzed and condensed organosilane, and a mixture thereof;
B. a curing agent for the composition;
C. optionally an organic solvent;
D. optionally an additional, essentially unreacted polyol;
E. optionally an additional essentially unreacted hydrolyzed and condensed organosilane;
F. optionally water; and
G. optionally a pigment.

The coating compositions of the invention usually contain at least 60 percent, preferably 70 percent, by weight substantially nonvolatile solids based on the total weight of the coating composition. Of the above components which can be present in a composition of the invention, those considered to be substantially nonvolatile (solids) include the organosilane-polyol, the curing agent, the additional essentially unreacted polyol, the additional essentially unreacted hydrolyzed and condensed organosilane, and the pigment.

Furthermore, any of the generally known nonvolatile additives such as fillers, fungicides, mildewcides, flow control agents, flatting agents, surfactants, defoamers, etc., which optionally may be present in compositions of the present invention, are considered herein to be substantially non-volatile solids.

Coating compositions containing at least 60 percent by weight substantially nonvolatile solids are considered herein to be "high solids" coating compositions. High solids coating compositions are particularly desirable since they provide less pollution to the environment caused by emission of volatile organic components, less toxicity, and lower flammability than solvent based coating compositions generally known in the art having solids contents of less than 60 percent by weight.

The organosilicon materials which are reacted with the hydroxyl-containing organic compounds, i.e., the hydrophilic polycarbinols, to prepare the organosilane-polyols for the present compositions are generally known. The organosilicon material is selected from the group consisting of an organosilane, a hydrolyzed and condensed organosilane, and a mixture thereof. As used herein, an organosilane is understood to mean a material corresponding to the formula, I,

wherein
R represents alkyl, aryl, alkylaryl, or arylalkyl;
r represents methyl, ethyl, or n-propyl; and
x is an integer ranging from 1 to 3.

Examples of organosilane materials corresponding to the above formula I include methyltrimethoxysilane, dimethoxydimethylsilane, methoxytrimethylsilane, triethoxymethylsilane, diethoxydimethylsilane, ethoxytrimethylsilane, dimethoxydiphenylsilane, diethoxydiphenylsilane, diethoxymethylphenylsilane, dimethoxymethylphenylsilane, ethoxydimethylphenylsilane, methoxydimethylphenylsilane, ethoxytripropylsilane, diethoxydipropylsilane, dimethoxydipropylsilane and the like. Mixtures of organosilanes may be used as the organosilicon material to prepare the organosilane polyol component of compositions of the invention.

Also suitable as the organosilicon material for preparation of the organosilane-polyol component of compositions of the invention are organosilanes corresponding to the above formula I which have been hydrolyzed and condensed to form the corresponding polysiloxane materials. These polysiloxane materials contain compounds containing one or more siloxane linkages represented by the formula, II,

Usually these hydrolyzed and condensed organosilanes are prepared in generally known manner by the hydrolysis of precursors which contain silicon atoms attached to substituents convertible to hydroxyl groups. These hydrolysis reactions typically may be illustrated by way of example as,

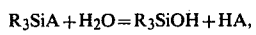

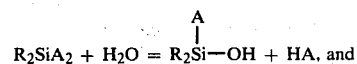

-continued

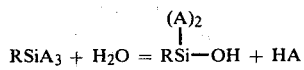

in which R is defined as in formula I above, and A represents a hydrolyzable alkoxy group such as methoxy or ethoxy. The above silanol containing products are condensed to produce one or more

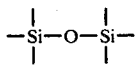

linkages in the hydrolyzed and condensed organosilanes. As will be appreciated by those skilled in the art, the hydrolysis and condensation reactions do not necessarily go to completion, and the terms "hydrolyzed and condensed organosilanes" is intended to include those organosilanes which have been hydrolyzed and condensed in a manner so as to produce at least one siloxane linkage. Additionally, it should be understood that "organosilanes which have been hydrolyzed and condensed" is intended to include those hydrolyzed and condensed materials prepared from precursors which contain silicon atoms attached to hydrolyzable substituents (represented, for example, by A in the illustrative equations immediately above) other than hydrolyzable alkoxy groups, such hydrolyzable substituents including, for example, acyloxy, halogen, etc. Such hydrolyzed and condensed materials prepared from precursors which contain silicon atoms attached to hydrolyzable substituents such as acyloxy, halogen, etc., are substantially the same as those hydrolyzed and condensed materials prepared from precursors which contain silicon atoms attached to hydrolyzable alkoxy groups inasmuch as both types of precursors when hydrolyzed form silanol groups.

A particularly useful hydrolyzed and condensed organosilane material for preparing the organosilane-polyol component of compositions of the invention is DOW CORNING 3037 INTERMEDIATE (available from Dow Corning Corporation having a methoxy content of about 18 percent by weight, a specific gravity at 25° Celsius (C.) of 1.07 and a viscosity at 25° C. of 14 centistokes). A particularly useful additional essentially unreacted hydrolyzed and condensed organosilane material for optional component (E) of the compositions of the invention is DOW CORNING 1248 FLUID (a secondary hydroxyl functional polydimethylsiloxane having a secondary hydroxyl content of 1.2 percent by weight, an average hydroxyl equivalent weight of 2,000, a specific gravity of 0.976 and a viscosity at 25° C. of 160 centistokes). It should be understood that optional component E when present in compositions of the invention is present in an essentially unreacted form, i.e., it has not been reacted with the organic compound containing at least two alcoholic hydroxyl moieties, i.e., component A(1), to form the organosilane-polyol (component A). The optional, unreacted hydrolyzed and condensed organosilane material may be present as a result of utilizing excess hydrolyzed and condensed organosilane as starting material for preparation of the organosilanepolyol component and also may be present as a separately added component of the composition, for example, apart from hydrolyzed and condensed organosilane utilized to prepare the organosilane-polyol.

The organic polycarbinols which can be reacted with the previously described organosilicon materials to form the organosilane-polyol (component A) generally are hydrophilic and have hydroxyl numbers of equal to or greater than 300 (or hydroxyl equivalent weights of equal to or less than 187), preferably equal to or greater than 400. As used herein, a hydrophilic polyol is a polyol which can be made to form a solution with at least 20, preferably at least 30 parts by weight of water to 100 parts by weight of polyol. The most preferred polyols are miscible with water in all proportions. Additionally, although a polyol may not form a solution with water in these defined proportions upon mixing at room temperature, often the polyol can be made to form a solution with water upon heating which will not separate into phases upon returning to room temperature. Polyols which will form solutions with water in the proportions defined above which do not phase separate upon returning to room temperature are also considered to be hydrophilic polyols within the meaning of the present invention.

The polyols suitable in the compositions of the invention include polyols in the broad classes including: simple diols, triols, and higher hydric alcohols; polyester polyol oligomers; polyether polyol oligomers; amide containing polyol oligomers; polyurethane polyol oligomers; and alkyd polyols. It is known to render normally water incompatible polyols, which otherwise fall into the broad classes set forth above hydrophilic within the meaning of the term hydrophilic polyols defined herein, by oxyalkylation with compounds such as ethylene oxide and/or propylene oxide or glycidyl ethers of low molecular weight alcohols or polyols such as methyl glycidyl ether, ethyl glycidyl ether, ethylene glycol monoglycidyl ether, and ethylene glycol diglycidyl ether. For example, this and other techniques for making polyols compatible with water are discussed in U.S. Pat. No. 3,959,201 and so much of this patent as relates to techniques for making polyols compatible with water is hereby incorporated by reference.

The simple diols, triols, and higher hydric alcohols useful in the preparation of the organosilicon-polyol are generally known, examples of which include: ethylene glycol; propylene glycol; 1,4-butanediol; 1,3-butanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 2,2,4-trimethyl-1,3-pentanediol; 1,4-cyclohexanediol; 1,4-cyclohexanedimethanol; 1,2-bis(hydroxymethyl)cyclohexane; 1,2-bis(hydroxyethyl)cyclohexane; trimethylolpropane; 2,2-dimethyl-3-hydroxypropyl-2,2-dimethyl-3-hydroxypropionate; diethylene glycol; triethylene glycol; dipropylene glycol; tetraethylene glycol; bisphenol-A; hydrogenated bisphenol-A; trimethylolethane, glycerol, sorbital, sucrose and mixtures thereof. Of these simple diols, triols and higher hydric alcohols, the 1,2-glycols such as ethylene glycol are less desirable. Additionally, of the above simple diols, triols and higher hydric alcohols, trimethylolpropane is preferred.

Polyether polyols which may be used in the preparation of the organosilane-polyols are generally known. Examples of polyether polyols include, for example, the generally known oxyalkylation products of various polyols, such as the poly(oxyethylene) glycols prepared by the acid or base catalyzed addition of ethylene oxide and/or propylene oxide to ethylene glycol, propylene glycol, or dipropylene glycol, and by the reaction of ethylene oxide and/or propylene oxide with polyols such as trimethylolpropane, glycerol, pentaerythritol, sorbitol, sucrose, and mixtures thereof. The polyether polyols also include the generally known poly(oxytetramethylene) glycols prepared by the polymerization of tetrahydrofuran in the presence of Lewis acid catalysts such as boron trifluoride, tin (IV) chloride, antimony pentachloride, antimony trichloride, phosphorous pentafluoride, and sulfonyl chloride. Of the above oxyalkylated polyols, oxyalkylation products such as the reaction products of propylene oxide and sorbitol are preferred.

Polyester polyol oligomers useful in the preparation of the organosilane-polyols are generally known and can be prepared by conventional techniques utilizing any of the previously described simple diols, triols, and higher hydric alcohols (optionally in combination with monohydric alcohols) with polycarboxylic acids. Examples of suitable polycarboxylic acids include: phthalic acid; isophthalic acid; terephthalic acid; trimellitic acid; tetrahydrophthalic acid; hexahydrophthalic acid; tetrachlorophthalic acid; oxalic acid; adipic acid; azelaic acid; sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid; fumaric acid; itaconic acid; and the like. Anhydrides of the above acids, where they exist, can also be employed and are encompassed by the term "polycarboxylic acid". In addition, certain materials which react in a manner similar to acids to form polyester polyol oligomers are also useful. Such materials include lactones such as caprolactone, and methylcaprolactone, and hydroxy acids such as tartaric acid and dimethylolpropionic acid. If a triol or higher hydric alcohol is used, a monocarboxylic acid, such as acetic acid, may be used in the preparation of the polyester polyol oligomer, and for some purposes, such as polyester polyol oligomer may be desirable. Polyester polyols oligomers which normally are not hydrophilic within the above definition but which can be rendered hydrophilic by appropriate techniques, for example, oxyalkylation utilizing ethylene oxide and propylene oxide are considered to be hydrophilic polyols in the context of the present invention.

Examples of the optional monohydric alcohols which may be used to prepare the polyester polyol oligomers include: ethanol, propanol; isopropanol; n-pentanol; neopentyl alcohol; 2-ethoxyethanol; 2-methoxyethanol; 1-hexanol; cyclohexanol; 2-methyl-2-hexanol; 2-ethylhexyl alcohol; 1-octanol; 2octanol; 1-nonanol; 5-butyl-5-nonanol; isodecyl alcohol; and mixtures thereof.

Amide-containing polyol oligomers are generally known and typically are prepared from any of the above described diacids or lactones and diols, triols, and higher hydric alcohols, and small amounts of diamines or aminoalcohols as illustrated, for example, by the reaction of neopentyl glycol, adipic acid, and hexamethylenediamine. Amide-containing polyol oligomers also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine and the like. Amide containing polyol oligomers which normally are not hydrophilic within the above definition but which can be rendered hydrophilic by appropriate techniques, for example, oxyalkylation utilizing ethylene oxide and propylene oxide are considered to be hydrophilic polyols in the context of the present invention.

Polyurethane polyol oligomers useful in the present invention can be produced by reacting any of the above-described polyols, including diols, triols, and higher hydric alcohols, polyester polyol oligomers, polyether polyol oligomers, and amide-containing polyol oligomers with an organic polyisocyanate. The organic polyisocyanate may be reacted with the polyol either directly to form the polyurethane polyol or by the generally known prepolymer technique wherein the polyol and polyisocyanate are reacted in relative proportions to first produce an isocyanate terminated prepolymer with subsequent reaction of the prepolymer with additional polyol to form the polyurethane polyol. Also, mixtures of organic isocyanate prepolymers with monomeric isocyanates (so-called semi-prepolymers) may be utilized in the prepolymer technique. Polyurethane polyol oligomers which normally are not hydrophilic within the above definition but which can be rendered hydrophilic by appropriate techniques, for example, oxyalkylation utilizing ethylene oxide and propylene oxide are considered to be hydrophilic polyols in the context of the present invention.

The polyisocyanate which is reacted with the polyol essentially can be any organic polyisocyanate. The polyisocyanate may be aromatic, aliphatic, cycloaliphatic, or heterocyclic and may be unsubstituted or substituted with groups such as halogen, etc. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; p-phenylene diisocyanate; biphenyl diisocyanate; 3,3'-dimethyl-4,4'-diphenylene diisocyanate; 1,2-propylene diisocyanate, 1,2-butylene and butylidene diisocyanates; tetramethylene-1,4-diisocyanate; hexamethylene-1,6-diisocyanate; 2,2,4-trimethylhexane-1,6-diisocyanate; lysine methyl ester diisocyanate; bis(isocyantoethyl)fumarate; isophorone diisocyanate; ethylene diisocyanate; dodecane-1,12-diisocyanate; cyclobutane-1,4-diisocyanate; cyclobutane-1,3-diisocyanate; cyclohexane-1,3-diisocyanate; cyclohexane-1,4-diisocyanate and mixtures thereof; methylcyclohexyl diisocyanate; hexahydrotoluene-2,4-diisocyanate; hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4-diisocyanate and mixtures thereof; and any known diisocyanates or polyisocyanates which are based on the above-mentioned monomeric organic isocyanates and contain carbodimide groups, allophanate groups, isocyanurate groups, urethane groups, acylated urea groups, biuret groups, uretidone groups, ester groups, thioether groups, and/or thioester groups.

As used herein, the term "alkyd polyols" refers to the generally known alkyd resins containing hydroxyl functionality. They typically are produced by reacting polyhydric alcohols, polycarboxylic acids, and fatty acids derived from drying, semi-drying or non-drying oils in various proportions depending upon the extent of hydroxyl functionality and properties desired in the alkyd-polyol. The techniques of preparing such alkyd resins are well known generally. Usually, the process involves reacting together the polycarboxylic acid and fatty acid or a partial glyceride thereof and the polyhydric alcohol (the latter usually in stoichiometric excess) in the presence of a catalyst such as litharge, sulfuric acid or a sulfonic acid to effect esterification with evolution of water. Examples of polyhydric alcohols typically used for preparation of the alkyd-polyols include the simple diols, triols, and higher hydric alcohols set forth previously in the description of organic polycarbinols useful for preparing the organosilane-polyols. Examples of polycarboxylic acids suitable for preparation of the alkyd-polyols include those set forth previously in the description of polycarboxylic acids useful for preparing the organosilane-polyols. Examples of suitable fatty acids include saturated and unsaturated acids such as stearic acid, oleic acid, ricinoleic acid, palmitic acid, linoleic acid, linolenic acid, licanic acid, elaeostearic acid, clupanodonic acid and mixtures thereof. The fatty acids may be in the form of the free acids with sufficient excess of the polyhydric alcohol being incorporated into the esterification mixture to compensate for their inclusion. However, in many instances, it is preferred to employ glyceride oils which have been partially alcoholized with a sufficient amount of a polyhydric alcohol such as glycerol to supply the requisite amount of available hydroxyls for the formation of the alkyd-polyol. Alkyd-polyols which normally are not hydrophilic within the above definition but which can be rendered hydrophilic by appropriate techniques, for example, oxyalkylation utilizing ethylene oxide and propylene oxides are considered to by hydrophilic polyols in the context of the present invention.

The organosilane-polyols useful in the coating compositions of the invention comprise the ungelled reaction products of the organic, hydrophilic polycarbinol and the organosilicon material. Although not intending to be bound by any theory of reaction, the formation of the organosilane-polyol is believed to proceed by reaction of carbinol groups on the polycarbinol with alkoxy groups on the organosilicon material with the release of the corresponding alcohol. Generally the amounts of starting polycarbinol and organosilicon material for formation of the organosilane-polyol are in a ratio of polycarbinol to organosilicon material to provide a corresponding ratio of equivalents of carbinol to alkoxy moieties ranging from 4:1 to 1:1, preferably 3:1 to 1.5:1. As used herein, one equivalent of carbinol moieties and one equivalent of alkoxy moieties correspond to 1 mole of carbinol moieties and 1 mole of alkoxy moieties respectively. The reaction between the polycarbinol and the organosilicon material generally is carried to at least 25 percent, preferably at least 50 percent, completion based on the reaction of the alkoxy moieties in the organosilicon material with release of the corresponding alcohol. The reaction product from the reaction of the polycarbinol with the organosilicon material must be homogeneous (i.e., does not phase separate into 2 or more layers). The hydroxyl equivalent weights of the resulting organosilane-polyols useful in the compositions of the present invention generally range from up to 800, preferably up to 350. The viscosities of the organosilane-polyols suitable for use in compositions of the invention generally range from 0.5 to 500 poise at 90 percent by weight solids in ethylene glycol monoethyl ether.

Coating compositions of the invention contain a curing agent for the composition. Examples of suitable curing agents include: aminoplast resins, phenoplast resins and blocked polyisocyanates. Of the above curing agents, aminoplast resins are preferred.

Aminoplast resins refer to the generally known condensation products of an aldehyde with an amino- or amino-group containing substance. Examples of suitable aminoplast resins for coating compositions of the invention include the reaction products of formaldehyde, acetaldehyde, crotonaldehyde, benzaldehyde, and mixtures thereof with urea melamine or benzoguanimine. Preferred aminoplast resins include the etherified products obtained from the reaction of alcohols and formaldehyde with melamine, urea, or benzoquanimine. Examples of suitable alcohols for making these etherified products include: methanol, ethanol, propanol, butanol, hexanol, benzylalcohol, cyclohexanol, 3-chloropropanol, and ethoxyethanol. Particularly preferred aminoplast resins are etherified melamine formaldehyde resins. Additional examples of suitable aminoplast resins are described in U.S. Pat. No. 4,075,141.

Phenoplast resins as used herein refer to the generally known condensation products of an aldehyde with a phenol. Suitable aldehydes include, for example, those previously described with reference to aminoplast resins. Preferred aldehydes are formaldehyde and acetaldehyde. Examples of suitable phenols for making the phenoplast resins include, for example, phenol per se, cresol, p-phenylphenol, p-tert-butylphenol, p-tert-amylphenol, and cyclopentylphenol. Examples of additional phenoplast resins are described in U.S. Pat. No. 4,075,141.

Blocked polyisocyanates are generally known. The blocked isocyanates which are useful in the coating compositions of the invention include any organic polyisocyanate in which the isocyanate groups have been reacted with a blocking agent. The unblocking temperatures of these blocked isocyanates generally will vary of course depending on the curing temperatures of the compositions of the invention. In the preparation of the blocked polyisocyanate, any suitable organic polyisocyanate may be used, examples of which include the polyisocyanates set forth previously in the description of the preparation of the polyurethane-polyol oligomers. Examples of suitable blocking agents include: butanol, phenol, ethanol, m-cresol, 2-methyl-2-propanol, benzenethiol, methylethylketoxime, and the like. Further description of many suitable blocked isocyanates can be found in *The Chemistry of Organic Film formers*, by D. H. Solomon, John Wiley and Sons, 1967, pages 216–217.

A wide range of generally known organic solvents optionally may be used in coating compositions of the invention. Examples of suitable solvents include: hydrocarbon solvents such as toluene, xylene, etc., ketones such as methylethyl ketone, methyl isobutyl ketone, cyclohexanone, methylamyl ketone, etc.; esters such as butyl acetate, etc., alcohols such as methanol, ethanol, propanol, butanol, etc.; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether, and propylene glycol dibutyl ether; the mono- and dialkyl ethers of diethylene glycol such as diethylene glycol monoethyl ether, diethylene glycol dibutyl ether, diethylene glycol diethyl ether, and diethylene glycol monobutyl ether acetate; acetamide; pyrrolidone; and mixtures thereof. Water compatible solvents such as methanol, ethanol, propanol, butanol, the water-soluble mono- and dialkyl-ethers of ethylene and propylene glycol, acetamide, and pyrrolidone are preferred.

The optional, additional unreacted polyol for coating compositions of the invention include any of the broad classes of polyols set forth previously in the description of organic polycarbinols for preparation of the organosilane-polyol component of compositions of the invention. Briefly stated, the optional, additional unreacted polyols include, for example: the simple diols, triols and higher hydric alcohols; the polyester polyol oligomers, the polyether polyol oligomers; the polyurethane polyol oligomers; and the alkyd polyols. The term "unreacted polyol" as used herein refers to polyol which has not been reacted with an organosilicon-material and which typically is not present in the reaction mixture during the preparation of the organosilane-polyol component for coating compositions of the invention. The formulation of coating compositions of the invention typically is carried out with the additional unreacted polyol and the organosilane-polyol being added as separate components. Preferred coating compositions contain additional unreacted polyol. It is preferred to utilize hydrophilic polyols within the definition of hydrophilic polyols above as the optional, additional unreacted polyol.

The optional, unreacted hydrolyzed and condensed organosilane for coating compositions of the invention include any of the hydrolyzed and condensed organosilanes set forth previously in the description of hydrolyzed and condensed organosilanes for preparation of the organosilane-polyol component of coating compositions of the invention. The term "unreacted hydrolyzed and condensed organosilane" as used herein refers to hydrolyzed and condensed organosilane which has not been reacted with an organic polycarbinol and which typically is not present in the reaction mixture during the preparation of the organosilane-polyol component for coating compositions of the invention. Thus, formulation of coating compositions of the invention typically is carried out with the additional unreacted hydrolyzed and condensed organosilane and the organosilane-polyol being added as separate components. Preferred coating compositions contain the additional, unreacted hydrolyzed and condensed organosilane.

Although the coating compositions of the invention may be utilized without the presence therein of water, a distinct advantage of these coating compositions is that they are water reducible, i.e., they can be thinned with water without phase separation occurring in the composition. Typically, coating compositions of the invention formulated without water to a total solids content as high as 90 percent by weight, can be reduced with water to a total solids content as low as 50 percent or lower by weight. As a minimum, the compositions of the invention including organosilane-polyol, and curing agent to be "water-reducible" will be compatible with at least 5 parts by weight of water based on 100 parts by weight of the aforesaid two components. The compositions of the invention including organosilane-polyol, and curing agent which are compatible with at least 20 parts by weight of water are preferred, and those compatible with at least 30 parts by weight of water are most preferred.

When aminoplasts are used as curing agents, coating compositions of the invention may be cured utilizing acid catalysts such as paratoluenesulfonic acid, methanesulfonic acid, ethanesulfonic acid, sulfuric acid and the like, and such catalysts typically are incorporated to accelerate curing. Typically the catalyst is incorporated in the composition to accelerate cure shortly prior to the time the composition is applied to the substrate.

Although when used for coating the paper on paper overlaid substrates, typically the coating compositions of the invention are unpigmented, it is considered to be within the scope of the invention to include pigments in the compositions. Examples of pigments include any of the generally known pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, etc. Mixtures of pigments also may be employed.

Coating compositions of the invention generally include from about 0.75 to about 40 percent by weight of the organosilane-polyol component, from about 15 to about 80 percent by weight of the curing agent, from 0 to about 40 percent by weight of the organic solvent, from 0 to about 50 percent by weight of the additional, essentially unreacted polyol, from 0 to about 5 percent by weight of the additional, essentially unreacted hydrolyzed and condensed organosilane, from 0 to about 30 percent by weight water, and from 0 to about 30 percent by weight pigment, all the percentages being based on the total weight of coating composition.

The compositions of the invention which do contain organic solvent, additional essentially unreacted polyol, and additional essentially unreacted hydrolyzed and condensed organosilane but no water typically include from about 1 to about 40 percent by weight of the organosilane-polyol, from about 20 to about 80 percent by weight of the curing agent, from about 5 to about 40 percent by weight of the organic solvent, from about 1 to about 50 percent by weight of the additional essentially unreacted polyol, and from about 0.3 to about 5 percent by weight of the additional essentially unreacted hydrolyzed and condensed organosilane, all percentages being based on the total weight of coating compositions.

The compositions of the invention which do contain organic solvent, additional essentially unreacted polyol, additional essentially unreacted hydrolyzed and condensed organosilane, and water typically include from about 0.75 to about 30 percent by weight of the organosilane-polyol, from about 15 to about 61 percent by weight of the curing agent, from about 3.0 to about 30 percent by weight of the organic solvent, from about 0.75 to about 38 percent by weight of the additional essentially unreacted polyol, from about 0.20 to about 4.0 percent by weight of the additional essentially unreacted hydrolyzed and condensed organosilane, and from about 5 to about 30 percent by weight of water, all percentages being based on the total weight of coating composition.

The coating compositions may be applied to a wide variety of substrates using any suitable application technique such as brushing, spraying, roller coating, doctor blade coating, etc. Examples of suitable substrates include paper, wood, hardboard, metal, plastics and the like. The compositions of the invention provide a particularly desirable coating for paper on paper-overlaid substrates because of the excellent tape release properties of the cured coatings prepared from these compositions. The preferred cured coatings exhibit both short and long term release properties against a wide variety of pressure sensitive adhesives contained on various pressure sensitive tapes. Thus, unpigmented compositions of the invention provide highly desirable coatings for decorative paper overlaid wood and hardboard panels for use in the home and business construction industries.

Coating compositions of the invention advantageously can be cured in short time periods. For example, preferred compositions typically may be cured within about 14 seconds at temperatures ranging from about 200 to about 250 degrees Fahrenheit (°F.), i.e., from about 93 to about 121 degrees Celsius (°C.). Of course, the use of lower curing temperatures would require longer curing times.

The invention is illustrated by the following examples. Quantities and percentages are by weight unless specifically stated otherwise. Wherever used herein "pbw" means "parts by weight".

EXAMPLE 1

(a) Preparation of an organosilane-polyol 1516.6 pbw of DOW CORNING 3037 INTERMEDIATE, and 743.0 pbw of trimethylolpropane are reacted at a temperature ranging from about 25° C. to about 210° C. under a blanket of nitrogen with the removal of about 302 milliliters (ml) methanol. The resulting product resin has a theoretical solids content of 100 percent by weight, a Gardner-Holdt viscosity of Y to Z at 85 percent by weight solids in ethylene glycol monoethyl ether, and a hydroxyl equivalent weight of 165. For use in the coating composition of part(b) below, the product resin is thinned to 50 percent by weight solids in ethylene glycol monoethyl ether and 36.3 pbw of a 1 percent solution of DOW CORNING 200 (a silicone fluid from DOW CORNING Corporation) in xylene is added.

(b) Coating Composition

A coating composition is prepared as follows. First the components in the following TABLE 1 are stirred together to produce a mixture having a total theoretical nonvolatile solids content of 83.64 percent by weight.

TABLE I

|  | parts by weight (pbw) |
|---|---|
| CYMEL 303[1] | 440.54 |
| The thinned organosilane-polyol resin of Example 1(a) | 73.38 |
| NIAX POLYOL LS 490[2] | 261.06 |
| Ethylene glycol monoethyl ether | 67.68 |
| DOW CORNING 1248 FLUID[3] | 31.71 |
| Leveling agent[4] | 35.67 |

[1]A commercial grade of hexamethoxymethylol melamine and methanol available from American Cyanamid Company.
[2]A polypropylene oxide polyol having a viscosity at 25° C. of about 8700 ± 1000 centipoise, a hydroxyl number of about 490 ± 10, and a specific gravity at 20° C. of about 1.09 available from Union Carbide Corporation.
[3]A secondary hydroxyl functional polydimethylsiloxane having a secondary hydroxyl content of 1.2 percent by weight, an average hydroxyl equivalent weight of 2,000, a specific gravity at 25° C. of 0.976, and a viscosity at 25° C. of 160 centistokes.
[4]A mixture of high boiling aromatics, ketones, and esters available as BYKETOL-OK from Byk-Mallinckrodt Chem. Produkte GmbH.

Next, 54.60 pbw of a 65 percent by weight solution of paratoluene-sulfonic acid in water is added to the above mixture with agitation followed by the addition with agitation of 261.02 pbw of water. The resulting water reduced coating composition of the invention herein designated 1A, has a theoretical solids content of 65 percent by weight.

EXAMPLE 2

(a) Preparation of an organosilane-polyol 1333.0 pbw of DOW CORNING 3037 INTERMEDIATE and 2666.0 pbw of NIAX POLYOL LS 490 are reacted in the presence of 0.14 pbw of tetraisopropyltitanante for 7 hours and 43 minutes in a temperature range of from 50° C. to 180° C. During the reaction, 70 milliliters (ml) of methanol is removed by distillation. The resulting product is an oranosilane-polyol resin having a theoretical solids content of 100 percent by weight, a Gardner-Holdt viscosity of Zl⁻, a hydroxyl number of 364.1, an acid value of 0, and a hydroxyl equivalent weight of 154.

(b) Coating Compositions

Three coating compositions herein designated 2A, 2B, and 2C respectively are prepared as follows. First, the components in the amounts by weight in the following TABLE 2 are stirred together to form three mixtures herein designated M1, M2, and M3, respectively.

TABLE 2

|  | parts by weight (pbw) | | |
|---|---|---|---|
| Mixture | M1 | M2 | M3 |
| CYMEL 303* | 395.5 | 395.5 | 395.5 |
| Organosilane-polyol resin of Example 2(a) | 157.0 | 210.0 | 301.0 |
| NIAX POLYOL LS 490* | 144.0 | 91.0 | 0 |
| Ethylene glycol monoethyl ether | 100.0 | 92.0 | 92.0 |
| Leveling agent* | 25.0 | 33.0 | 33.0 |

*Described in EXAMPLE 1.

To each of the above mixtures M1, M2, and M3, respectively, is added with agitation 3.5 pbw of DOW CORNING 1248 FLUID* to produce mixtures herein designated M4, M5, and M6, respectively, each having a total theoretical nonvolatile solids content of 84.85 percent by weight. *Described in Example 1.

Next, 45.38 pbw of a 65 percent by weight solution of paratoluenesulfonic acid in water is added with agitation to each of the above mixtures, M4, M5, and M6 followed by the addition with agitation of 251.92 pbw of water to each of the mixtures. The resulting water reduced coating compositions of the invention 2A, 2B and 2C each have a theoretical solids content of 65 percent by weight.

EXAMPLE 3

(a) Preparation of an organosilane-polyol

A reaction vessel is charged at room temperature with 1333.0 pbw of DOW CORNING 3037 INTERMEDIATE 2666.0 pbw of NIAX POLYOL LS490 and 0.14 pbw of tetraisopropyltitanate. The charge is slowly heated over a period of 15 hours and 43 minutes to a temperature of 200° C. with the removal by distillation of 150 ml of methanol. The heating source is removed and the product is allowed to cool. The product is thinned to 90 percent by weight solids in N-methylpyrrolidinone. The resulting product is an organosilane-polyol resin having a solids content of 105° C. of 84.7 percent by weight, a viscosity at 25° C. of 76.54 stokes, a hydroxyl number of 161.8 and an acid value of 0.3.

(b) Coating Composition

A coating composition is prepared as follows. First the components in the following TABLE 3 are stirred together to produce a first mixture.

TABLE 3

|  | parts by weight (pbw) |
| --- | --- |
| CYMEL 303* | 395.5 |
| Organosilane-polyol resin of Example 3(a) | 105.0 |
| NIAX POLYOL LS 490* | 196.0 |
| Ethylene glycol monoethyl ether | 90.0 |
| Leveling agent* | 33.0 |

To the above first mixture is added with agitation, 3.5 pbw of DOW CORNING 1248 FLUID* to produce a second mixture having a total theoretical nonvolatile solids content of 85.05 percent by weight.
*Described in Example 1.

Next, 42.26 pbw of a 65 percent by weight solution of paratoluenesulfonic acid in water is added with agitation to the above second mixture followed by the addition with agitation of 253.92 pbw of water. The resulting water reduced coating composition of the invention herein designated 3A, has a theoretical total solids content of 65 percent by weight.

EXAMPLE 4

Each of the coating compositions 1A, 2A, 2B, 2C, and 3A of the previous Examples is applied by direct roll coat to the paper side of several decorative paper-overlaid, wood based wall panels to a wet film thickness ranging from about 0.4 to about 0.5 mills (about $1.0 \times 10^{-3}$ to about $1.3 \times 10^{-3}$ centimeters). Each of the coated panels is passed twice through a curing oven at 425° F. (218° C.). The dwell time in the oven for each pass is 14.5 seconds and each board is heated to a board surface temperature of about 200° F. (93.3° C.) during each pass. The dry film thickness of the cured coatings on the panels ranges from about 0.20 to about 0.25 mills (about $0.51 \times 10^{-3}$ to about $0.64 \times 10^{-3}$ centimeters). As soon as the panels containing the cured coatings are removed from the curing oven they are subjected to the following tests 1 through 4.

TEST 1:
A spot of about 2 or 3 drops of acetone is allowed to remain for 60 seconds on the cured coating on a panel from each of the groups of several panels prepared from coating compositions 1A, 2A, 2B, 2C, and 3A. The coating at the spot is then scratched by fingernail to check for any softness of the cured coating. A rating of "pass" means that the cured coating at the spot does not exhibit any noticeable signs of softness and appears to be as hard as the cured coating on the same panel which has not been spotted with acetone. The results of Test 1 are summarized in the following TABLE 4.

TEST 2 (Pressurized Stack Test):
Several panels containing cured coatings prepared from coating composition 1A are stacked in a group with each panel presenting coated face up to the back of the next panel on top except for the topmost panel which is coated face down to the next panel beneath it (i.e., the two topmost panels are stacked face to face). The group of panels are then placed between the platens of a hydraulic press which platens are maintained at a temperature of 160° F. (71.1° C.). The group of panels is allowed to remain in the press for about 16 hours at a pressure of 25 pounds per square inch ($1.7 \times 10^5$ newtons per square meter) after which they are removed and the coatings examined visually for any evidence of marking and for evidence of the panels having become stuck together at any place. A rating of "pass" indicates that the cured coatings exhibited no visual evidence of marking or of having been stuck together.

Groups of several panels containing cured coatings prepared from coating compositions 2A, 2B, 2C, and 3A are each subjected to Test 2 according to the procedure described immediately above for panels prepared from coating composition 1A. The results of Test 2 are summarized in the following TABLE 4.

TEST 3 (Tape Release From Stacked Panels):
To the coated surface of a panel from each group of several panels prepared from coating compositions 1A, 2A, 2B, 2C, and 3A, after having been subjected to TEST 2 above, is applied about a 1 inch by 3 inch (2.5 centimeter × 7.5 centimeter) strip of frosted tape ("FROSTY" tape available from 3M Corporation) and a strip of like dimensions of masking tape (No. 250 available from 3M Corporation). After the designated times set forth in TABLE 5 below, the strips of tape are quickly ripped from the cured coatings and the previously taped areas examined visually for evidence that the cured coating and/or paper beneath has been removed from the panel. A rating of "pass" indicates that there is no evidence that the cured coating or the paper beneath has been removed by the tape. A rating of "X percent" indicates that approximately X percent of the coated area previously beneath the tape has been picked off by the tape. The results of TEST 3 are summarized in the followng TABLE 5.

TEST 4 (Tape Release From Unstacked Panels):
To the cured coated surface of a panel from each group of several panels prepared from coating compositions 1A, 2A, 2B, 2C, and 3A, which coated panel has been allowed to remain unstacked at room temperature for 1 day, is applied a strip of frosted tape and a strip of masking tape of the types and dimensions described in TEST 3 above. After the designated times set forth in TABLE 5 below, the strips of tape are quickly ripped from the cured coatings and the previously taped areas examined visually for evidence that the cured coating and/or paper beneath has been removed from the panel. A rating of "pass" and the designation "X%" carry the same interpretation in TEST 4 as in TEST 3 above. The results of TEST 4 are summarized in the following TABLE 5.

TEST 5:
The cured coating on a panel from each of the groups of several panels prepared from coating compositions 1A, 2A, 2B, 2C, and 3A is subjected to the acetone spot test described in TEST 1 above except that the test is performed on panels having been subjected to TEST 2 (the pressurized stack test). A rating of "pass" carries the same interpretation as in TEST 1. The results of TEST 5 are summarized in the following TABLE 4.

TABLE 4

| Coating Composition | Test 1 Acetone | Test 2 Pressurized Stack | Test 5 Pressurized Stack/Acetone |
|---|---|---|---|
| 1A | Pass | Pass | Very slightly soft |
| 2A | Pass | Pass | Pass |
| 3A | Pass | Pass | Slightly soft |
| 2B | Very slightly soft | Pass | Very slightly soft |
| 2C | Pass | Pass | Pass |

TABLE 5

| Coating Composition | Test No. | | 1 | 2 | 4 | 6 | 7 | 11 | 15 | 16 | 18 | 20 | 22 | 25 | 27 | 30 | 32 | 37 | 39 | 44 |
|---|---|---|---|---|---|---|---|---|---|---|---|---|---|---|---|---|---|---|---|---|
| 1A | 3[1] | M[3] | —[6] | √[5] | √ | √ | — | √ | — | 1% | — | 1% | — | √ | — | √ | — | — | — | — |
|  |  | F[4] | — | 12% | 5% | <1% | — | √ | — | √ | — | √ | — | <1% | — | 2% | — | 6% | — | 5% |
|  | 4[2] | M | — | √ | √ | √ | — | √ | — | √ | — | √ | — | √ | — | √ | — | — | — | — |
|  |  | F | — | <1% | 1% | 4% | — | √ | — | √ | — | √ | — | √ | — | √ | — | — | — | — |
| 2A | 3 | M | — | √ | √ | √ | — | √ | — | √ | — | √ | — | √ | — | 1% | — | — | — | √ |
|  |  | F | — | √ | 1% | 10% | — | 20% | — | 35% | — | 70% | — | 90% | — | 97% | — | 95% | — | 90% |
|  | 4 | M | — | √ | √ | √ | — | √ | — | √ | — | √ | — | √ | — | √ | — | — | — | — |
|  |  | F | — | 1% | √ | √ | — | √ | — | √ | — | √ | — | 5% | — | 10% | — | — | — | — |
| 2B | 3 | M | √ | — | √ | — | √ | √ | √ | — | √ | — | √ | — | √ | — | — | — | — | — |
|  |  | F | √ | — | √ | — | √ | 2% | 4% | — | 4% | — | 15% | — | 25% | — | 90% | — | 90% | — |
|  | 4 | M | √ | — | √ | — | √ | √ | √ | — | √ | — | √ | — | √ | — | — | — | — | — |
|  |  | F | √ | — | √ | — | √ | √ | √ | — | √ | — | √ | — | √ | — | — | — | — | — |
| 2C | 3 | M | √ | — | √ | — | √ | √ | √ | — | √ | — | √ | — | √ | — | — | — | — | √ |
|  |  | F | √ | — | √ | — | √ | 2% | 1% | — | 2% | — | 20% | — | 20% | — | 80% | — | 90% | — |
|  | 4 | M | √ | — | √ | — | √ | √ | √ | — | √ | — | √ | — | √ | — | — | — | — | — |
|  |  | F | √ | — | √ | — | √ | √ | √ | — | √ | — | √ | — | 1% | — | — | — | — | — |
| 3A | 3 | M | — | √ | √ | <1% | — | √ | — | √ | — | <1% | — | √ | — | √ | — | — | — | — |
|  |  | F | — | 2% | 20% | 35% | — | 35% | — | 45% | — | 50% | — | 40% | — | 75% | — | 35% | — | 30% |
|  | 4 | M | — | √ | √ | √ | — | √ | — | √ | — | √ | — | √ | — | 5% | — | — | — | — |
|  |  | F | — | 1% | 1% | √ | — | <1% | — | <1% | — | <1% | — | 2% | — | √ | — | — | — | — |

LEGEND
[1]Tape Release/Stacked Panels
[2]Tape Release/Unstacked Panels
[3]No. 250 Masking Tape from 3M Corp.
[4]FROSTY Tape from 3M Corp.
[5] √ means pass
[6]— means not measured.

EXAMPLE 5

(a) Preparation of an organosilane-polyol

A reaction vessel equipped with stirrer, heating mantle, thermometer, distillation column, and means for providing a blanket of nitrogen is charged at room temperature with 1303.6 pbw of trimethylol propane. Next, the charge is heated over 1 hour and 5 minutes to a temperature of 120° C. When the temperature reaches 120° C., the addition of DOW CORNING 3037 INTERMEDIATE is begun and continued over 3 hours and 10 minutes while the temperature rises from 120° C. to 130° C. By the end of this 3 hour and 10 minute period, a total of 2660.8 pbw of the DOW CORNING 3037 INTERMEDIATE has been added. Heating is continued for an additional 6 hours and 25 minutes while the temperature rises to 140° C. whereupon heating is discontinued, and the reaction vessel is allowed to cool to room temperature within a period of 11 hours and 20 minutes. At the end of this period, heating is begun again and continued for 8 hours and 10 minutes until the temperature reaches 160° C. whereupon heating is discontinued, and the reaction vessel is allowed to cool to room temperature within a period of 15 hours and 30 minutes. At the end of this period, heating is begun again and continued for 7 hours and 55 minutes at the end of which period the temperature is 185° C. During the total time, a total of 495 ml of methanol is distilled and removed. The reaction product is an organosilane-polyol resin having a theoretical solids content of 100 percent by weight, a Gardner-Holdt viscosity at 25° C. of U+, and a density of 1.076 grams/cubic centimeter. The organosilanepolyol resin is then reduced with ethylene glycol monoethyl ether to a total solids content of 80 percent by weight.

(b) Coating Composition

A coating composition is prepared as follows. First, 348.0 pbw of CYMEL 303 and 206.5 pbw of NIAX POLYOL LS 490 are stirred together followed by the addition with agitation of 58.0 pbw of the organosilane-polyol of Example 5(a). Next, 23.2 pbw of DOW CORNING 1248 FLUID is added with agitation. The resulting mixture is agitated with a Cowles blade to a temperature of 120° F. (48.9° C.) at which point is added 42.9 pbw of N-methyl-2-pyrrolidone and 27.8 pbw of the BYKETOL-OK leveling agent described in EXAMPLE 1. The resulting mixture is agitated until smooth after which 2.3 pbw of diisopropanolamine is stirred into the mixture to raise the pH to 8.0. The mixture is then agitated for about 15 minutes followed by the addition of 116.0 pbw of deionized water. Next, 45.36 pbw of a 65 percent by weight solution of paratoluenesulfonic acid in water and 108.68 pbw of water are successively added with agitation to produce a water reduced coating composition of the invention, herein designated 5A having a theoretical solids content of 73.6 percent by weight.

(c) Coating composition 5A is both applied to the paper side of several decorative paper-overlaid, wood based wall panels and cured in the same manner as described in EXAMPLE 4 above.

(d) Tests 1, 2, 3, and 4 described in EXAMPLE 4 are performed on the cured coating compositions 5A in the same manner as described previously except that in Test 3, Number 600 masking tape available from 3M Corporation is utilized instead of the No. 250 masking tape and in Tests 1 and 5 the acetone is allowed to remain on the film for 3 minutes instead of 60 seconds. The test results are summarized in the following TABLE 6.

TABLE 6

| Coating Composition | Test No. | Results | | |
|---|---|---|---|---|
| 5A | 1 | PASS | | |
| | 2 | PASS | | |
| | 5 | PASS | | |
| | Test No. | No. Days | 1 Day | 7 Days |
| | 3 | Frosty | Pass | 60% |
| | | #600 Masking | 8% | 90% |
| | 4 | Frosty | Pass | Pass |
| | | #600 Masking | Pass | 1% |

EXAMPLE 6

(a) Preparation of an organosilane-polyol

A reaction vessel equipped with heating mantle, stirrer, thermometer and distillation column is charged at room temperature with 570.5 pbw of DOW CORNING 3037 INTERMEDIATE, 279.5 pbw of trimethylolpropane, 2 drips of tetraisopropyl titanate (TYZOR TPT) and 2 drops of a 1 percent by weight solution of DOW CORNING 200 in xylene. The charge is heated for 25 minutes to a temperature of 116° C. whereupon 1 additional drop of tetraisopropyl titanate is added. Heating is continued for an additional 4 hours and 51 minutes until the temperature reaches about 160° C. whereupon the heating mantle is removed and the reaction vessel allowed to cool. During the reaction 95 ml of methanol is distilled and removed. The resulting product is an organosilane-polyol resin having a theoretical solids content of 100 percent by weight and a Gardner-Holdt viscosity at 25° C. of Y to Z (measured at 85 percent by weight solids in butanol). The organosilane-polyol resin is then reduced with ethylene glycol monethyl ether to a total solids content of 50 percent by weight.

(b) Coating Composition

A coating composition is prepared as follows: 324.0 pbw of CYMEL 303, 26.0 pbw of BYKETOL-OK leveling agent, 54.0 pbw of the organosilane-polyol resin of EXAMPLE 6(a), and 2.7 pbw of DOW CORNING 1248 FLUID are blended together with agitation until the temperature of the mixture reaches 100° F. (37.8° C.) at which point is added 216.0 pbw of PLURACOL PeP-650*. The mixture is agitated until the temperature again reaches 100° F. (37.8° C.) at which point is added 31.0 pbw of ethylene glycol monoethyl ether followed by the slow addition of 223.0 pbw of deionized water. Next, 48.22 pbw of a 65 percent by weight solution of para-toluenesulfonic acid in water (A 15009Z53) is added to the mixture. The resulting composition is a water reduced coating composition of the invention.

*A polyol from Wyandotte Chemicals Corporation which a condensation product of pentaerythritol and propyleneoxide and which has a hydroxyl number of about 374, an average molecular weight of about 600, a specific gravity at 25° C. of about 1.05 and a viscosity at 25° C. of about 1200 centipoise (about 1143 centistokes).

What is claimed is:

1. A water reducible coating composition comprising:

A. An organosilane-polyol havng a hydroxyl number equal to or greater than 70 which is a reaction product of (1) a hydrophilic polyol having a hydroxyl number equal to or greater than 300; and (2) an organosilicon material selected from the group consisting of an organosilane, a hydrolyzed and condensed organosilane, and a mixture thereof; and B. a curing agent for said coating composition selected from the group consisting of an aminoplast resin, a phenoplast resin, and a blocked polyisocyanate.

2. The coating composition of claim 1 wherein said curing agent is an aminoplast resin.

3. The coating composition of claim 1 further comprising an organic solvent.

4. The composition of claim 3 wherein said organic solvent is a water reducible solvent.

5. The coating composition of claim 1 wherein said organosilane contains at least one phenyl group.

6. The coating composition of claim 1 further comprising an additional essentially unreacted polyol.

7. The coating composition of claim 6 further comprising an additional essentially unreacted hydrolyzed and condensed organosilane.

8. The coating composition of claim 1 further comprising water.

9. The coating composition of claim 7 further comprising water.

10. The coating composition of claim 7 further comprising an organic solvent.

11. The coating composition of claim 9 further comprising an organic solvent.

12. The coating composition of claim 7 wherein the sum of said organosilane-polyol, said curing agent, said additional essentially unreacted polyol, and said additional essentially unreacted hydrolyzed and condensed organosilane, by weight total at least 60 percent of the total weight of said composition.

13. The coating composition of claim 10 wherein the amount of said organosilane-polyol ranges from about 1 to about 40 percent by weight, the amount of said curing agent ranges from about 20 to about 80 percent by weight, the amount of said organic solvent ranges from about 5 to about 40 percent by weight, the amount of said additional essentially unreacted polyol ranges from about 1 to about 50 percent by weight, and the amount of said additional essentially unreacted hydrolyzed and condensed organosilane ranges from about 0.3 to about 5 percent by weight, all percentages being based on the total weight of said coating composition.

14. The coating composition of claim 11 wherein the amount of said organosilane-polyol ranges from about 0.75 to about 30 percent by weight, the amount of said curing agent ranges from about 15 to about 61 percent by weight, the amount of said organic solvent ranges from about 3.0 to about 30 percent by weight, the amount of said additional essentially unreacted polyol ranges from about 0.75 to about 38 percent by weight, the amount of said additional essentially unreacted hydrolyzed and condensed organosilane range from about 0.20 to about 4.0 percent by weight, and the amount of water ranges from about 5 to about 30 percent by weight, all percentages being based on the total weight of said coating composition.

15. The coating composition of claim 1 further comprising a pigment.

* * * * *